United States Patent [19]
Lopes

[11] Patent Number: 6,066,225
[45] Date of Patent: May 23, 2000

[54] METHOD FOR PRODUCING A CONTROL PANEL FASCIA MADE OF AT LEAST THREE MATERIALS FOR VEHICLE HEATING

[75] Inventor: Albert Lopes, Saint-Prix, France

[73] Assignee: AFE Plasturgie, Andilly, France

[21] Appl. No.: 09/040,910

[22] Filed: Mar. 18, 1998

[30] Foreign Application Priority Data

Mar. 18, 1997 [FR] France ................................ 97 03270

[51] Int. Cl.⁷ .................................................. B29C 45/16
[52] U.S. Cl. ...................... 156/245; 156/277; 264/135; 264/247; 264/254; 264/259; 264/328.1; 264/331.13; 264/331.18; 362/489
[58] Field of Search .................................. 156/242, 245, 156/277; 264/132, 135, 247, 254, 259, 328.1, 331.13, 331.18, 331.21; 428/195; 362/489; 296/70

[56] References Cited

U.S. PATENT DOCUMENTS

| | | |
|---|---|---|
| 4,917,927 | 4/1990 | Sakaitani et al. .................. 428/195 |
| 5,227,222 | 7/1993 | Ogawa et al. . |
| 5,264,172 | 11/1993 | Rosica et al. .................. 264/132 |
| 5,512,226 | 4/1996 | Rosica et al. .................. 264/259 |
| 5,514,317 | 5/1996 | Rosica et al. .................. 264/247 |

FOREIGN PATENT DOCUMENTS

| | | |
|---|---|---|
| 4006649 | 8/1991 | Germany . |
| 2261187 | 5/1993 | United Kingdom . |
| 9423925 | 10/1994 | WIPO . |

*Primary Examiner*—Michael W. Ball
*Assistant Examiner*—Michael A Tolin
*Attorney, Agent, or Firm*—Christie, Parker & Hale, LLP

[57] ABSTRACT

The fascia of a vehicle heating control panel is obtained by overmolding onto a monolayer flat film made of polycarbonate, elements made of different thermoplastic materials so as to allow marks and/or symbols formed by silkscreen printing on the film and present on a rotary knob to be illuminated by a transparency, while at the same time preventing the leaking of light.

9 Claims, 4 Drawing Sheets

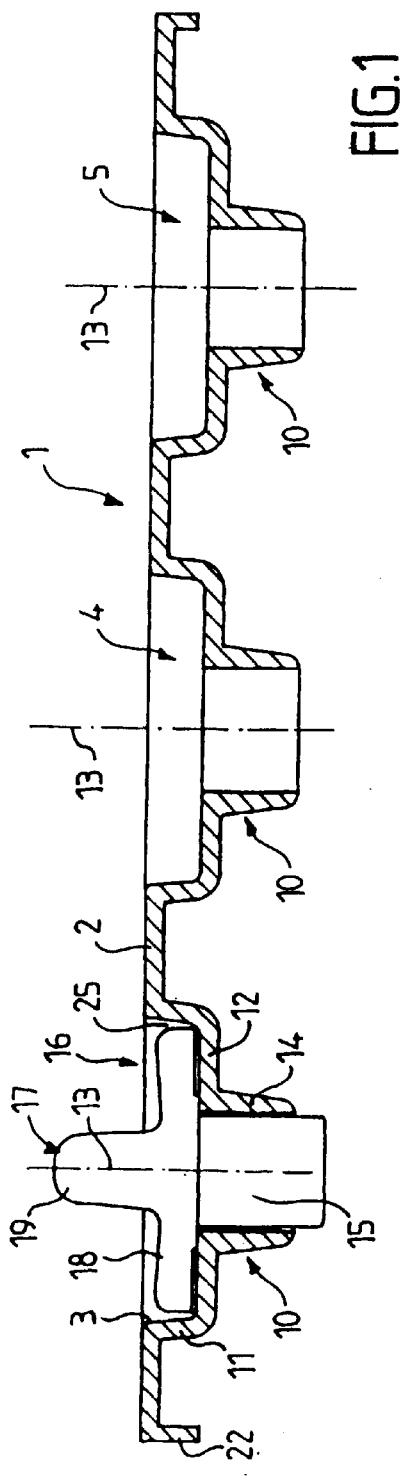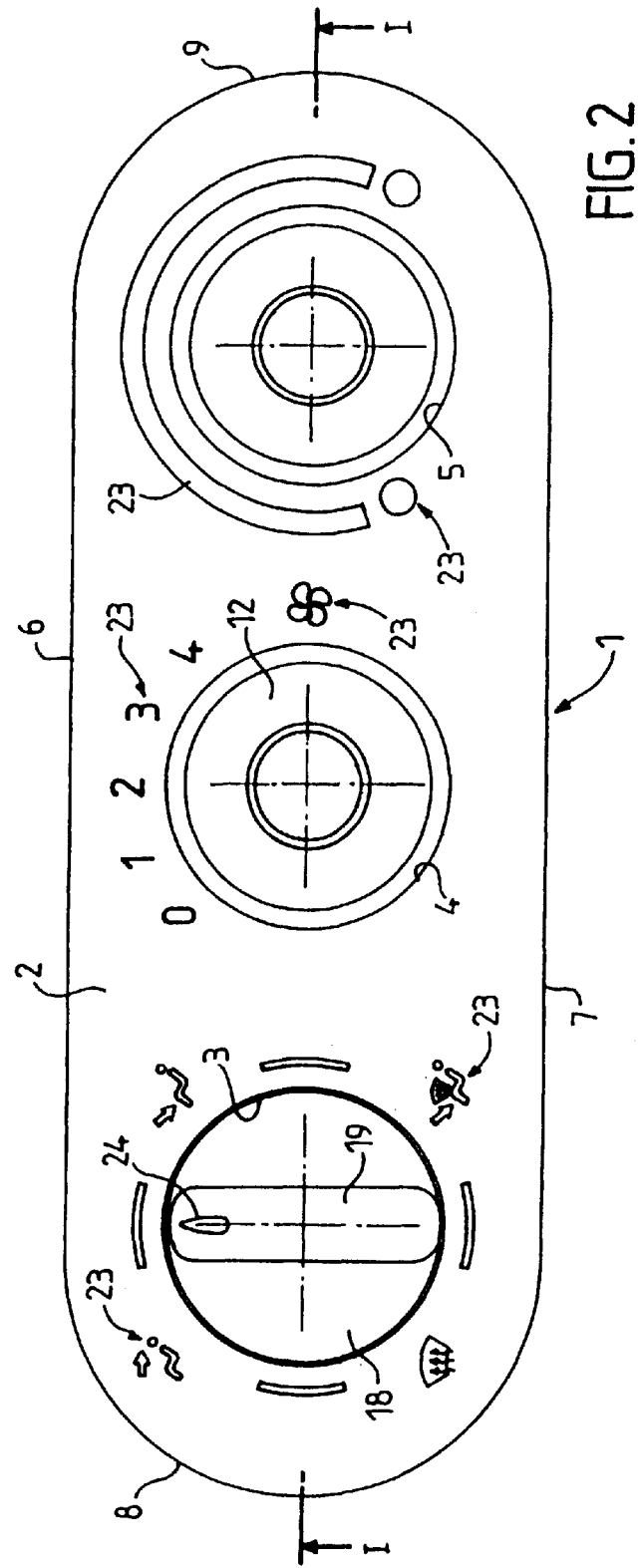

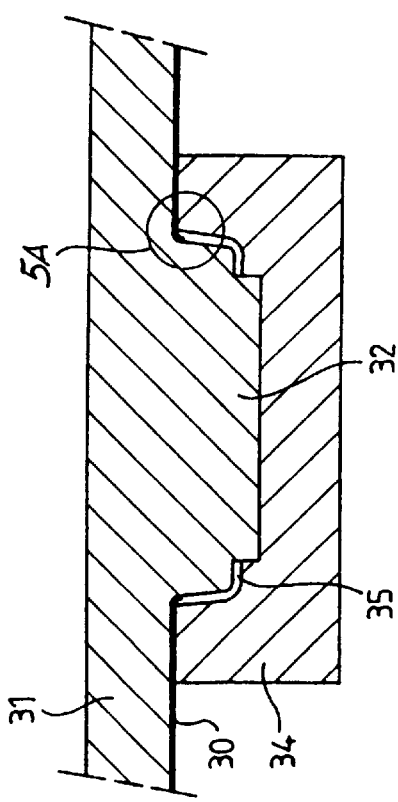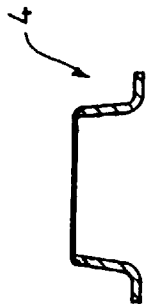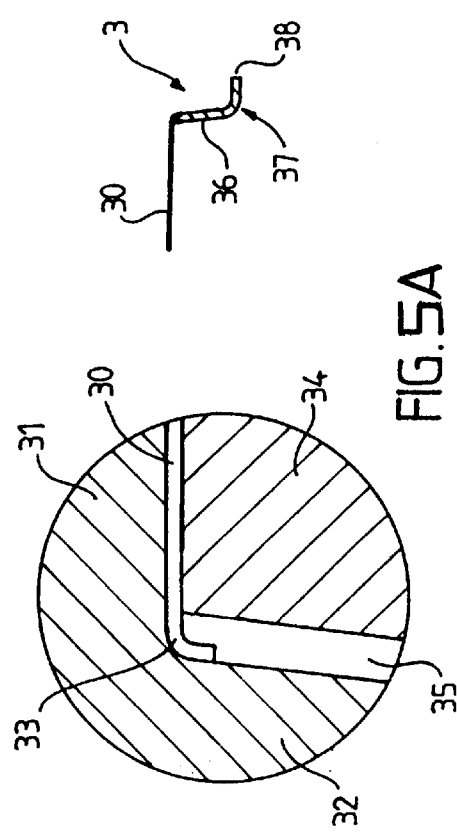

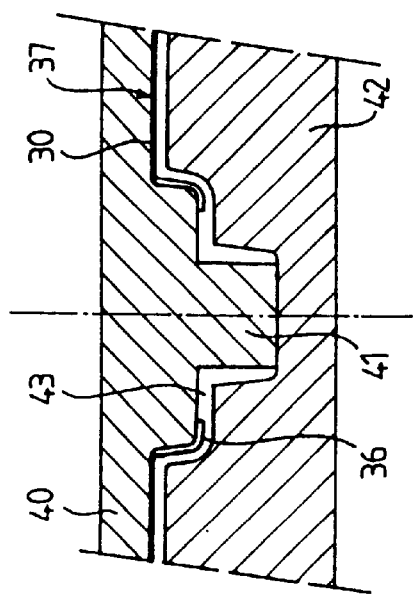
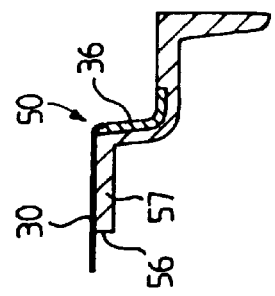
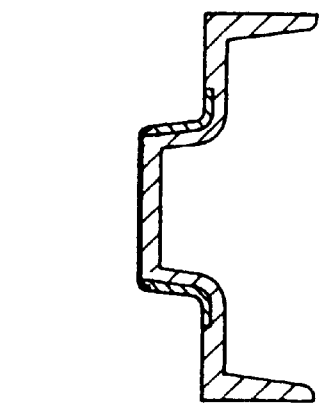
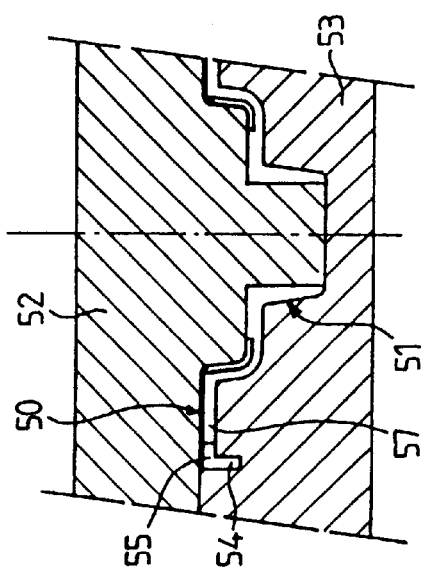
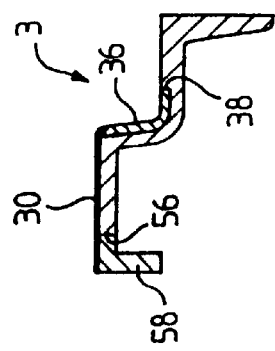
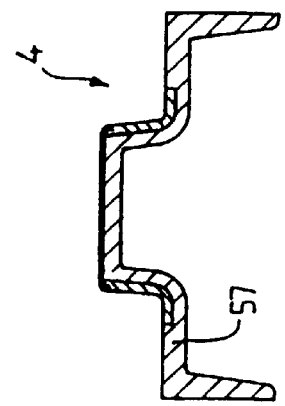

METHOD FOR PRODUCING A CONTROL PANEL FASCIA MADE OF AT LEAST THREE MATERIALS FOR VEHICLE HEATING

BACKGROUND OF THE INVENTION

The invention relates to a method for producing a control panel fascia, particularly for heating the cockpit of a vehicle, intended to have at least one rotary knob, comprising a mounting plate which defines a front face of the fascia and, for each knob, a tubular wall extending backwards from the mounting plate and meeting the latter along the edge of an approximately circular opening formed therein, the tubular wall having, in succession, in the axial direction, a first region adjacent to the opening and having approximately the same radius thereof, housing a head of the knob over at least part of the axial length thereof, and a second region of smaller radius than the head, meeting the first region at a shoulder, housing and guiding the rotation of a guide stalk of the knob, the head and the front face, near the opening, carrying marks and/or symbols which can be brought to face each other depending on the position into which the knob is turned, and which may be illuminated, through the material of the knob and the fascia, from a light source placed behind this fascia.

The term "radius" here denotes a distance with respect to an axis, which can vary in the circumferential direction when the element in question is not strictly circular. In this case, the inequalities mentioned for the radii of various elements need to be verified all around the axis.

The expression "front face" denotes that face of the mounting plate which faces towards the user of the control panel, and the terms "front" and "rear" refer to this convention. Note that in the case of a vehicle heating control panel, the front face generally faces the rear of the vehicle.

Forming the front face of the mounting plate with a film of transparent thermoplastic material which is inked by silkscreen printing to form colored marks and/or symbols and to make the rest of the surface opaque is known. The shoulder of the tubular wall, which is behind the head of the knob, must allow light from the light source through to illuminate at least one mark present on the head and intended to come to face various symbols depending on the position into which the knob is turned. By contrast, light must not pass around the head of the knob, between this head and the first region of the tubular wall.

To achieve this, it has been proposed that the tubular wall be made of transparent material, and that the silkscreen printed film be dished in such a way that it also covers part of the internal face of the tubular wall, as far as up behind the annular gap between the first region of this wall and the head. However, this has led to a deformation of the symbols and marks during the dishing operation, and to tearing and cracking of the film, leading to a high reject rate.

SUMMARY OF THE INVENTION

The object of the invention is to overcome the aforementioned drawbacks.

The invention aims particularly at a method of the kind defined in the introduction, and envisages that the fascia be obtained using the following steps:

a) a monolayer flat film of a first thermoplastic material, which has at least one opening slightly smaller than the opening to be formed in the mounting plate and carrying, near this opening, the marks or symbols to be obtained on the front face, is placed in a mold, the film being pressed onto a plate formed by a first element of the mold and being pushed tightly, along the edge of its opening, around a boss of the first element which projects from the plate;

b) an opaque second thermoplastic material is injected into an annular cavity of the mold surrounding the boss and containing an annular zone of the film adjacent to the opening, which zone is pressed by the injected material against the plate and against the boss, the film being trapped in the mold so that it is impervious to the material injected, around the annular zone, and the mold being sized in such a way that the film defines the front face of the mounting plate and that the second material injected defines part of the tubular wall, limited to a fraction of its thickness, adjacent to its internal face, and ending at the rear in an axial opening of radius slightly smaller than that of the head;

c) a light-conducting third thermoplastic material is injected onto the part-finished item obtained in step b) in order to complete the thickness of the mounting plate and the tubular wall, the chemical nature and the temperature of injection of each of the second and third thermoplastic materials being chosen such that this material binds securely, when it is injected, to the previous one or to the previous ones without deforming it (or them).

Optional additional or alternative features of the invention are listed below:

d) an opaque fourth thermoplastic material is injected onto the part-finished item obtained in step c) in order to form a peripheral rim of the fascia extending backwards from the mounting plate, the chemical nature and the temperature of injection of the fourth thermoplastic material being chosen such that this material binds securely, when it is injected, to the first and third thermoplastic materials, without deforming them.

The rear face of the film remains uncovered by the third material during step c), and is covered by the fourth material during step d), over a peripheral region so as to strengthen the bond between the film and the fourth material.

The first material is based on polycarbonate, the second material is based on a blend of polycarbonate and ABS, the third material is based on at least one polymer chosen from polymethyl methacrylate and polycarbonate, and the fourth material, if there is one, is based on ABS.

The temperatures at which the successive materials are injected are about 280° C. for step b), 240° C. for step c), and, as appropriate, 230° C. for step d).

The first material is more or less transparent and colored marks and/or symbols and/or opaque areas are formed by silkscreen printing on the front face of the film prior to step a).

The film is cut from a flat sheet and defines, for the mounting plate, a front face which is flat or derives from a flat surface by bending without stretching or contraction along the surface.

DESCRIPTION OF THE DRAWINGS

The features and advantages of the invention will be explained in greater detail in the description which follows, with reference to the appended drawings, in which:

FIG. 1 is a cross-section, on I—I of FIG. 2, of the fascia of a control panel according to the invention, on which a knob is mounted;

FIG. 2 is a front view of the assembly of FIG. 1;

FIGS. 4, 5, 7 and 9 are cross-sectional views showing successive steps in the manufacture of the fascia;

FIGS. 4A and 5A are enlarged details of FIGS. 4 and 5 respectively; and

FIGS. 6, 8 and 10 are cross-sectional views showing the part-finished items and the finished fascia obtained on completion of the steps of FIGS. 5, 7 and 9 respectively.

DETAILED DESCRIPTION OF THE INVENTION

Figure 3:
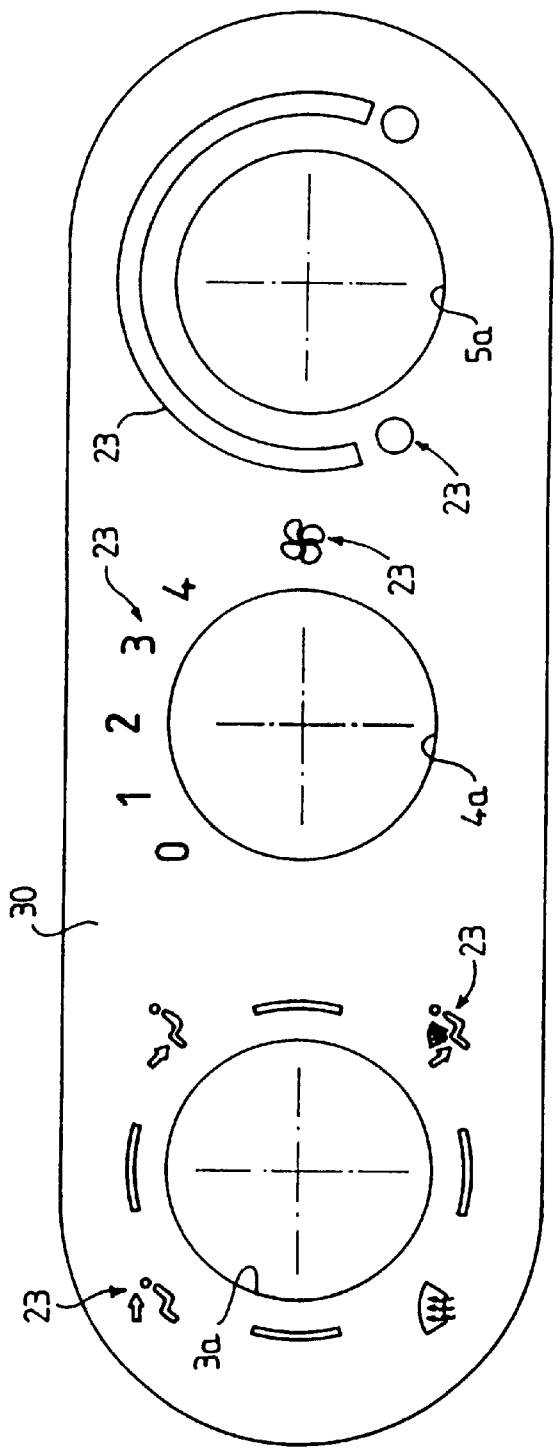
FIG. 3 is a front view of a cut and silkscreen printed film intended to form the front face of the fascia.

The fascia 1 depicted in FIGS. 1 and 2 comprises a flat mounting plate 2 with three circular openings of the same radius 3, 4 and 5 aligned with each other. The mounting plate 2 has an elongate shape in the direction in which the openings are aligned, this plate being delimited by straight upper and lower longitudinal edges 6, 7 and two convex semicircular ends 8 and 9. Along the edge of each of the openings 3, 4 and 5, the mounting plate meets a tubular wall 10 extending backwards, comprising a first region 11 which is slightly frustoconical, narrowing from the mounting plate, then a flat radial shoulder 12 coming in towards the axis 13 of the opening and of the tubular wall from the region 11, and finally a region 14 once more extending away from the plane of the mounting plate from the shoulder 12, the region 14 having a cylindrical internal face and an external face which is slightly frustoconical to make demolding easier. The region 14 guides the rotation of the cylindrical stalk 15 of a knob 16, the latter also comprising a head 17 formed of a flat flange 18 of circular outline, housed radially inside the region 11 of the tubular wall 10 and of a diametral rib 19 projecting forward from the opening 3. To simplify the drawing, just one knob 16 is shown, associated with the opening 3. However, the complete control panel has a similar knob corresponding to each opening 4 and 5.

The fascia 1 also has a peripheral rim 22 extending backwards from the perimeter of the mounting plate 2.

As can be seen in FIG. 2, symbols 23 appear on 20 the front face of the mounting plate 2, around each of the openings 3, 4 and 5. Furthermore, the rib 19 of the knob 16 at one of its diametral ends has a mark 24 in the shape of an arrowhead. This knob, and identical knobs associated with the openings 4 and 5, can be placed in different angular positions about axes 13 so that the marks 24 come to face various symbols 23. The symbols and marks are illuminated, through the fascia and the knobs, from one or more light sources, not depicted, placed behind the mounting plate 2. Because of the position of the marks 24, the light which reaches them has to pass through the shoulders 12 of the tubular walls. By contrast, no light must emerge through the annular gap 25 between the flange 18 of this knob and the region 11 of the corresponding tubular wall. Likewise, light must not pass through the rim 22 and form a luminous halo around the fascia 2.

Figure 4A:
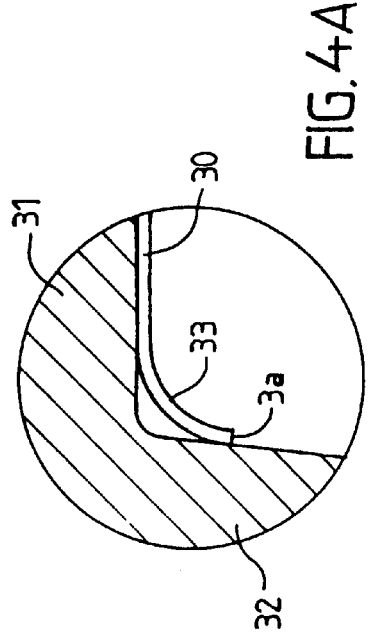
Figure 4:
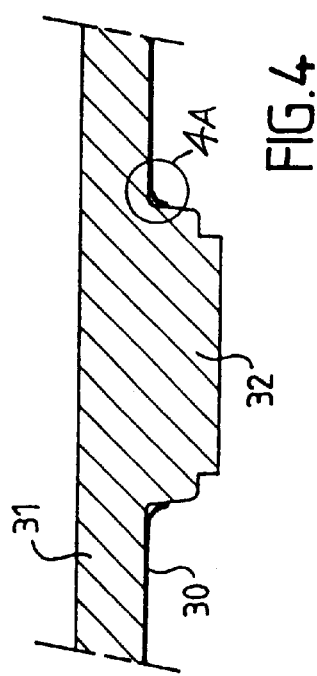

To produce the fascia 1, the starting point is the part-finished item illustrated in FIG. 3, cut from a flat monolayer film of transparent polycarbonate 0.3 mm thick, available commercially, so as to have the contour of the mounting plate 2 as described above, and three circular openings 3a, 4a and 5a laid out like the openings 3, 4 and 5 and of a diameter very slightly smaller than that of these openings. The front face of the part-finished item 30 is inked by silkscreen printing to form the symbols 23 and to color the rest of the surface in black and make it opaque. The inked front face of the part-finished item 30 is pressed onto a metal plate 31 from which there project three axisymmetric bosses 32 which forcibly penetrate the openings 3a, 4a and 5a, deforming and parting from the plate 31 an annular zone 33 of the part-finished item surrounding each of these openings, as shown in FIGS. 4 and 4A. Next, as shown in FIGS. 5 and 5A, the male mold part consisting of the plate 31 equipped with the bosses 32 is associated with a female part 34 to define, around each boss, an annular cavity 35 containing the annular zone 33. An opaque blend of polycarbonate and of acrylonitrile-butadiene-styrene copolymer (ABS) is injected into this cavity. The injected material presses the annular zone 33 against the plate 31 and the base of the boss 32, and wets the rear face of this zone. The presence of polycarbonate in the blend makes it possible to ensure good adhesion between the injected-material and the film of polycarbonate. The presence of ABS allows injection to be performed at a temperature, 280° C., which is low enough to avoid deforming the film. This material is also able to withstand the testing, especially the climatic testing (90° C. and 95% humidity) laid down in motor-vehicle manufacturer technical specifications. Around the zone 33, the part-finished item 30 is trapped between the two mold parts so as to limit the flow of the injected material.

FIG. 6 shows the annular element 36 molded in polycarbonate/ABS around the opening 3 and, in part, the element molded around the opening 4.

The part-finished item 37 thus obtained is transferred to a second mold (FIG. 7) made up of a male part 40 in the form of a plate with three bosses 41 and of a female part 42, which parts between them delimit a cavity 43. The part-finished item 37 is housed in this cavity, pressed against the male part 40 and 41. The geometric shape of the cavity corresponds to that of the fascia 1 to be produced, except in regard to the periphery of this fascia, as will be seen in detail later.

Transparent polymethyl methacrylate at a temperature of 240° C., at which no degradation and no deformation of the part-finished item 37 occur, is injected into that part of the cavity 43 which is not occupied by the part-finished item 37. This material is also able to withstand the testing imposed by motor-vehicle manufacturer technical specifications.

The part-finished item 50 thus obtained, illustrated in FIG. 8, is then placed in the cavity 51, which it almost completely fills, of a third mold (FIG. 9) made up of a male part 52 and of a female part 53. The geometric shape of the cavity 51 exactly corresponds to that of the fascia 1 to be produced. The part-finished item 50 leaves free only a peripheral annular region of L-shaped profile, one leg 54 of which L corresponds to the rim 22 of the fascia and the other leg 55 of which extends along the rear face of the film 30, between the leg 54 and the peripheral edge 56 of the element 57 formed by injection into the mold of FIG. 7, the edge 56 being, as can be seen in FIG. 8, set back slightly from the peripheral edge of the film 30. Black ABS at a temperature of 230° C., at which temperature no damage to the part-finished item 50 occurs, is injected into the remaining cavity 54 and 55.

FIG. 10 shows how the various constituent materials of the fascia are arranged geometrically, thanks to appropriate sizing of the molds used.

The film 30 covers all of the front face of the mounting plate 2, and the rounded region which connects this face to the internal face of the tubular wall 10, to the edge of each of the openings 3, 4 and 5. Each polycarbonate/ABS annular element 36 defines the internal face of the corresponding tubular wall, as a continuation of the film 30, over the entire axial length of the region 11, over the rounded region connecting the latter to the shoulder 12, and over the peripheral part of this shoulder, beyond the radius of the axial opening 38 of the element 36. The polymethacrylate element 57 forms the rest of the tubular walls 10, that is to say the rest of the thickness of these beyond the opening 38, and all of its thickness up to these openings, as well as the rest of the thickness of the mounting plate 2, as far as the edge 56 placed a small distance from the peripheral edge of the mounting plate. Finally, the annular ABS element 58, with an L-shaped profile, forms the rest of the thickness of the mounting plate beyond the edge 56 and the rim 22.

The transparent element 57, which constitutes all of the thickness of the shoulder 12 of the tubular wall 10, inside the axial opening 38 of the element 36, allows light to pass to illuminate the marks 24 on the knobs. By contrast, the opaque element 36 prevents light from reaching the annular gap 25 between the flange 18 of the knob and the region 11 of the tubular wall. The element 58, which is also opaque, prevents light from passing around the periphery of the fascia.

Depending on the control panel surroundings, the presence of the opaque rim 22 may prove unnecessary. In this case, the element 57 is extended as far as in line with the peripheral edge of the film 30 and step d) is omitted. Instead of being carried out separately as described, this step d) may also be carried out at the same time as step b), using the same material, if the component design allows this.

Furthermore, instead of being flat, the front face of the mounting plate 2 may have a convex or concave curvature, about one or two axes, obtained and stabilized by the successive overmoldings.

I claim:

1. A method for producing a control panel fascia intended to have at least one rotary knob, comprising a mounting plate which defines a front face of the fascia and, for each said knob, a tubular wall extending backwards from the mounting plate and meeting the mounting plate along an edge of an approximately circular opening formed therein, the tubular wall having, in succession in an axial direction, a first region adjacent to the opening and having a radius that is approximately the same as a radius of the opening, housing a head of the knob over at least part of an axial length thereof, and a second region having a radius smaller than a radius of the head, meeting the first region at a shoulder, the second region housing and guiding the rotation of a guide stalk of the knob, the head and the front face, near the opening, carrying at least one of the marks and symbols which can be brought to face each other depending on the position the knob is turned, and which may be illuminated, through a material of the knob and the fascia, from a light source placed behind the fascia, characterized in that the fascia is obtained using the following steps:

a) a monolayer flat film of a first thermoplastic material, which has at least one opening slightly smaller than the opening to be formed in the mounting plate and carrying, near this opening, at least one of the marks and symbols to be obtained on the front face, is placed in a mold, the film being pressed onto a plate formed by a first element of the mold and being pushed tightly, along an edge of its opening, around a boss of the first element which projects from the plate;

b) an opaque second thermoplastic material is injected into an annular cavity of the mold surrounding the boss and containing an annular zone of the film adjacent to the opening of the film, which zone is pressed by the injected material against the plate and against the boss, the film being trapped in the mold so that it is impervious to the material injected, around the annular zone, and the mold being sized in such a way that the film defines the front face of the mounting plate and that the second material injected defines part of the tubular wall, limited to a fraction of its thickness, adjacent to an internal face thereof, and ending in an axial opening of a radius slightly smaller than that of the head; and c) a light-conducting third thermoplastic material is injected onto the partially finished item obtained in step b) in order to complete the thickness of the mounting plate and the tubular wall, the second and third thermoplastic materials having a chemical nature and a temperature of injection chosen such that the third thermoplastic material binds securely, when it is injected, to at least one of the first and second thermoplastic materials without deforming it (or them).

2. A method according to claim 1, in which:

d) an opaque fourth thermoplastic material is injected onto the first and third materials in order to form a peripheral rim of the fascia extending backwards from the mounting plate, the fourth thermoplastic material having a chemical nature and a temperature of injection chosen such that the fourth material binds securely, when it is injected, to the first and third thermoplastic materials, without deforming them.

3. A method according to claim 2, in which a rear face of the film remains uncovered by the third material during step c), and is covered by the fourth material during step d), over a peripheral region so as to strengthen the bond between the film and the fourth material.

4. A method according to claim 2, in which the fourth material is based on ABS.

5. A method according to claim 4, in which the temperature at which the fourth material is injected is about 230° C.

6. A method according to claim 1, in which the first material is based on polycarbonate, the second material is based on a blend of polycarbonate and ABS, and the third material is based on at least one polymer chosen from polymethyl methacrylate and polycarbonate.

7. A method according to claim 6, in which the temperature at which the material is injected is about 280° C. for step b), and 240° C. for step c).

8. A method according to claim 1, in which the first material is more or less transparent and colored marks and/or symbols and/or opaque areas are formed by silk-screen printing on a front face of the film prior to step a).

9. A method according to claim 1, in which the film is cut from a flat sheet and defines, for the mounting plate, a front face which is flat or derives from a flat surface by bending without stretching or contraction along the surface.

* * * * *